DYNAMICALLY BALANCED TELEPHONE NETWORK

Filed Nov. 15, 1962 6 Sheets-Sheet 1

INVENTOR
J. M. BROWN
BY Roy M. Porter, Jr.
ATTORNEY

April 13, 1965 J. M. BROWN 3,178,521

DYNAMICALLY BALANCED TELEPHONE NETWORK

Filed Nov. 15, 1962 6 Sheets-Sheet 3

April 13, 1965 J. M. BROWN 3,178,521

DYNAMICALLY BALANCED TELEPHONE NETWORK

Filed Nov. 15, 1962 6 Sheets-Sheet 5

United States Patent Office 3,178,521

Patented Apr. 13, 1965

3,178,521

DYNAMICALLY BALANCED TELEPHONE NETWORK

James M. Brown, Summit, N.J., assignor to Bell Telephone Laboratories, Incorporated, New York, N.Y., a corporation of New York Filed Nov. 15, 1962, Ser. No. 237,827

14 Claims. (Cl. 179—170)

This invention relates to a two-wire signal transmission system and particularly to a two-way signaling system including a two-way signal transmission medium, such as a two-wire line, and an adjoining link, such as a four-wire circuit, providing separate paths for transmitting to the two-way medium and from that medium. It is well known in the art that systems of this sort are used in connecting distantly separated telephone subscribers, and it is further known that for a given connection the impedance of the two-way signal transmission medium depends on the particular route and instrumentalities used in establishing that connection.

Systems for joining a two-way signal transmission medium to an adjoining link commonly comprise a junction which includes an artificial balancing impedance for the purpose of balancing the two-way signal transmission medium. Such a system is shown in Patent 2,302,374, issued November 17, 1942, for the invention of Doren Mitchell. The two-way signal transmission medium is described as balanced when the artificial balancing impedance is related to the impedance of the two-way medium in such a way that no part of a signal transmitted from the adjoining link into the junction is transmitted back into the adjoining link as an echo or sidetone.

The system of the above-cited Mitchell patent eliminates echoes with electromechanical apparatus for changing the impedance value of the artificial balancing impedance in response to the alternating-current signals across the two-way medium and across the artificial balancing impedance to balance the two-way medium as operating conditions affecting the impedance of the two-way medium are changed.

The moving parts of such an electromechanical system contribute a substantial portion of its cost and inertial effects. Moving parts also constitute a major problem from the standpoint of reliability.

It is therefore an object of this invention to balance a two-way signal transmission medium by varying the artificial balancing impedance of a junction of the aforesaid type in response to the alternating-current signals across the two-way signal transmission medium and the artificial balancing impedance without the aid of moving parts.

According to the invention, an entirely electronic system is provided in which nonlinear impedance elements of fixed physical configuration, such as varistors, are used as part of the artificial balancing impedance and are electrically biased in response to differences between the alternating-current signal across the two-way signal transmission medium and the alternating-current signal across the artificial balancing impedance. Preferably, the nonlinear impedance elements and all other components of the system are solid-state devices. In particular, the bias of the nonlinear impedance elements is controlled by a shunting transistor. As used herein, bias refers to a voltage or current common to all the nonlinear impedance elements which substantially determines their net impedance.

According to a first feature of the invention, nonlinear distortion is substantially avoided by using a balanced impedance arrangement within the artificial balancing impedance. The alternating-current signal applied to the artificial balancing impedance varies the impedances of a pair of the nonlinear elements in opposite directions in a mutually compensating manner.

According to a second feature of the invention, severe unbalancing of the two-way signal transmission medium is prevented when signals are not passing from the adjoining link to the two-way medium by previously charging a capacitor with a signal responsive to one of the aforesaid differences in alternating-current signals and then disconnecting the charging circuit from the capacitor.

According to a third feature of the invention, the aforesaid capacitor for the artificial balancing impedance is allowed to recover rapidly from accidental short circuits and open circuits in the two-way medium by a dynamic range restorer which restores the voltage on the capacitor smoothly to the nearest limit of a normal operating range while the charging circuitry is disconnected from the capacitor. If nonetheless, the abnormal condition in the two-way medium persists after the charging circuitry is reconnected to the capacitor, the dynamic range restorer is over-ridden so that a balance may be obtained.

A fourth feature of the invention takes into account the normal dynamics of a telephone conversation by causing the disconnection to occur rapidly, but the reconnection to occur relatively slowly. In the first case, loss of the bias of the nonlinear elements is prevented; and in the second case certain transients are given a chance to subside without unbalancing the two-way medium.

According to a fifth feature of the invention, a differential rectifier responding to alternating-current signals across the two-way medium and the artificial balancing impedance includes balanced rectifying arrangements for preventing drift within the differential rectifier and further includes a circuit in which all the rectifying devices carry a common direct current. The output signal of the differential rectifier thereby more accurately corresponds to the difference between the aforesaid alternating-current signals.

According to a sixth feature of the invention, nonlinear distortion is further reduced by locating the nonlinear impedance elements within the artificial balancing impedance so that the alternating-current signal impressed upon those elements is as small as possible in comparison to the bias impressed upon them. Specifically, the nonlinear impedance elements of the artificial balancing impedance may be introduced between cascaded amplifiers which produce the alternating-current signal which is compared with the alternating-current signal across the two-way transmission medium.

A seventh feature of the invention involves arrangements for distributing the variable components of the artificial balancing impedance among a plurality of electrically buffered locations. In particular, this feature allows a plurality of degrees of freedom in the variation of the artificial balancing impedance to be introduced. Sidetone and echoes are thereby further reduced.

Other objects and features of the invention will become apparent from the following detailed description and the drawings, in which.

Figure 1:
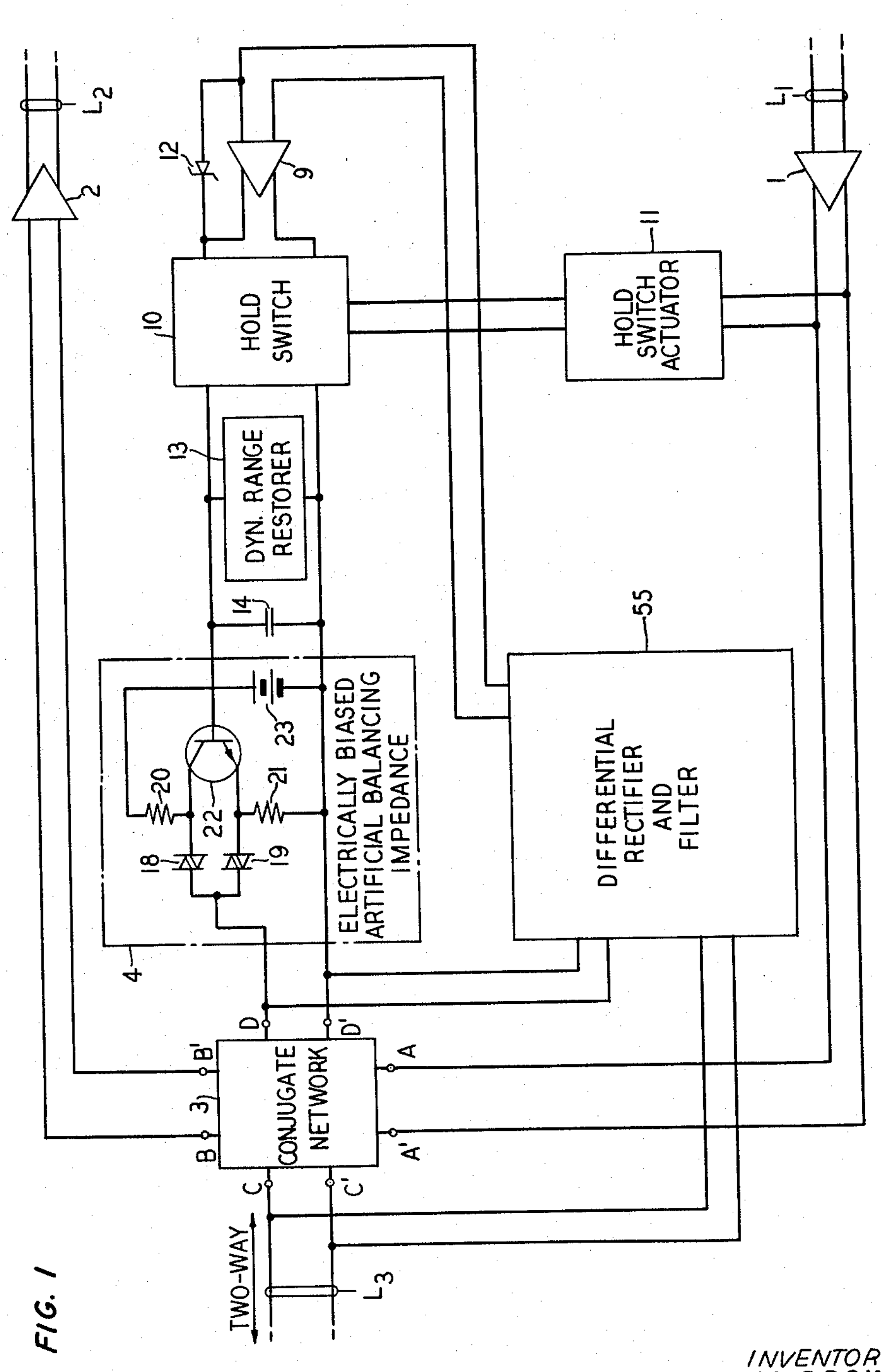
FIG. 1 is a schematic and block diagrammatic illustration of a preferred embodiment of the invention.
Figure 1A:
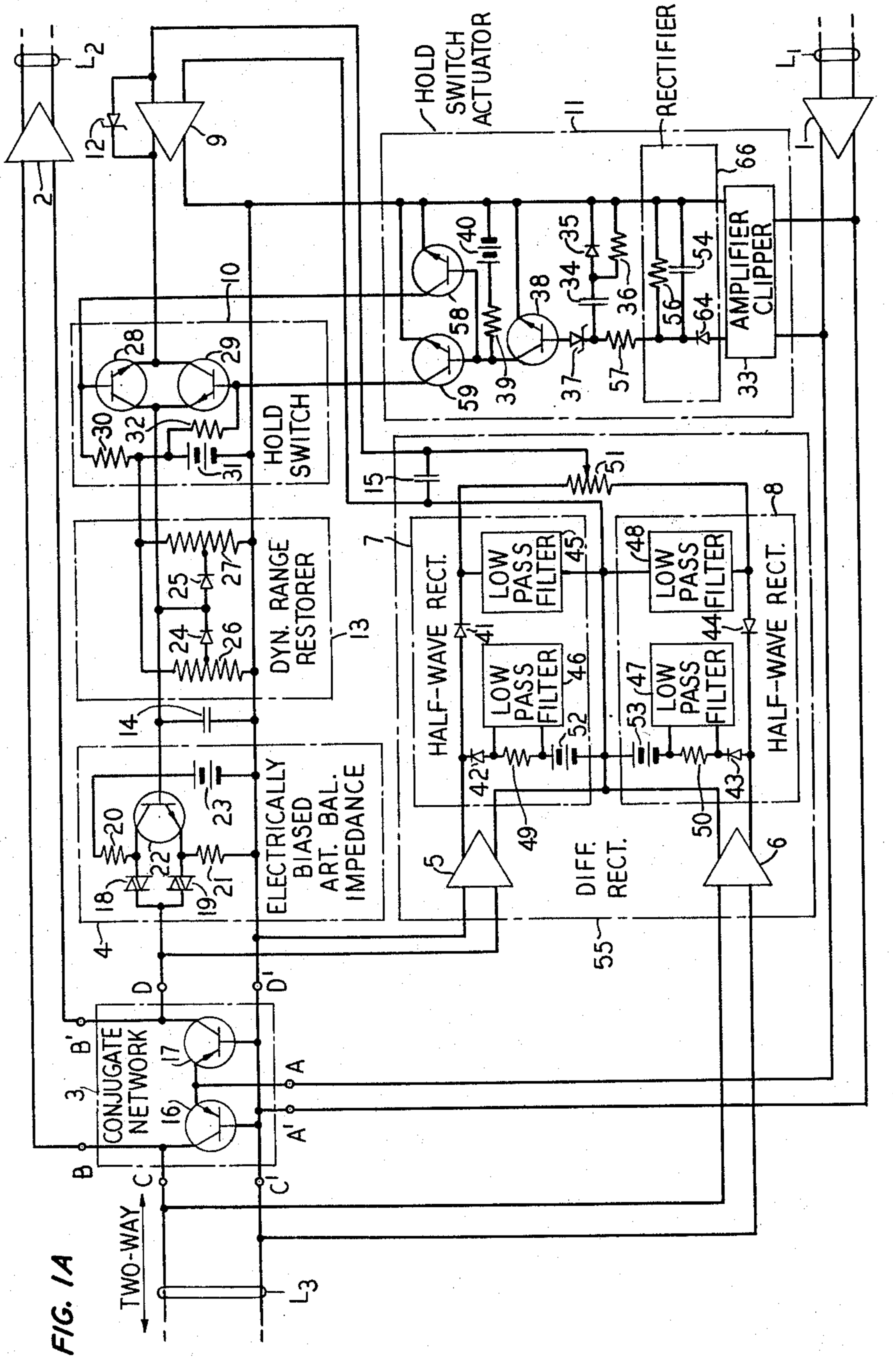
FIG. 1A is a schematic and block diagrammatic illustration of additional structural details of the embodiment of FIG. 1.
Figure 3A:
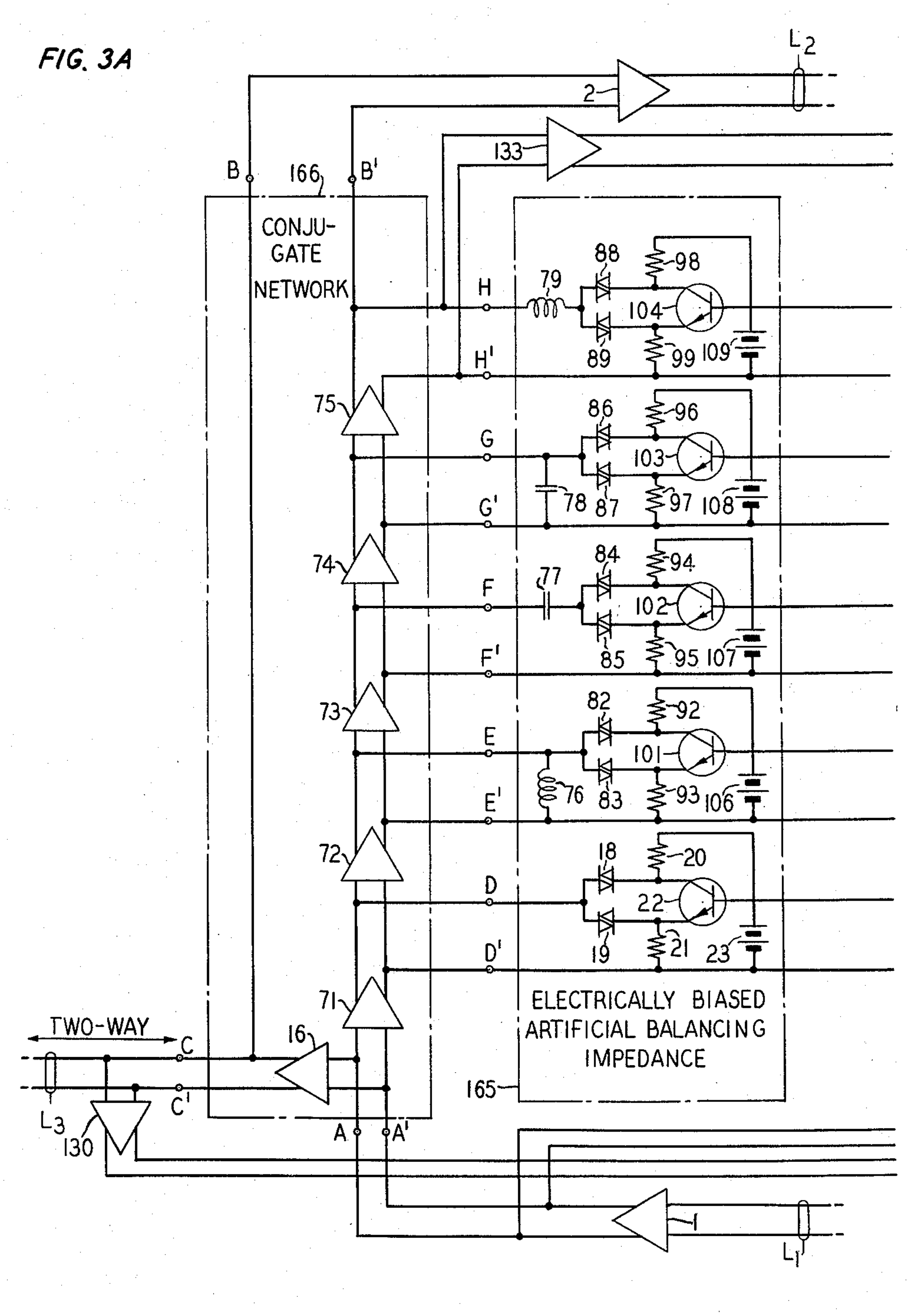
Figure 3B:
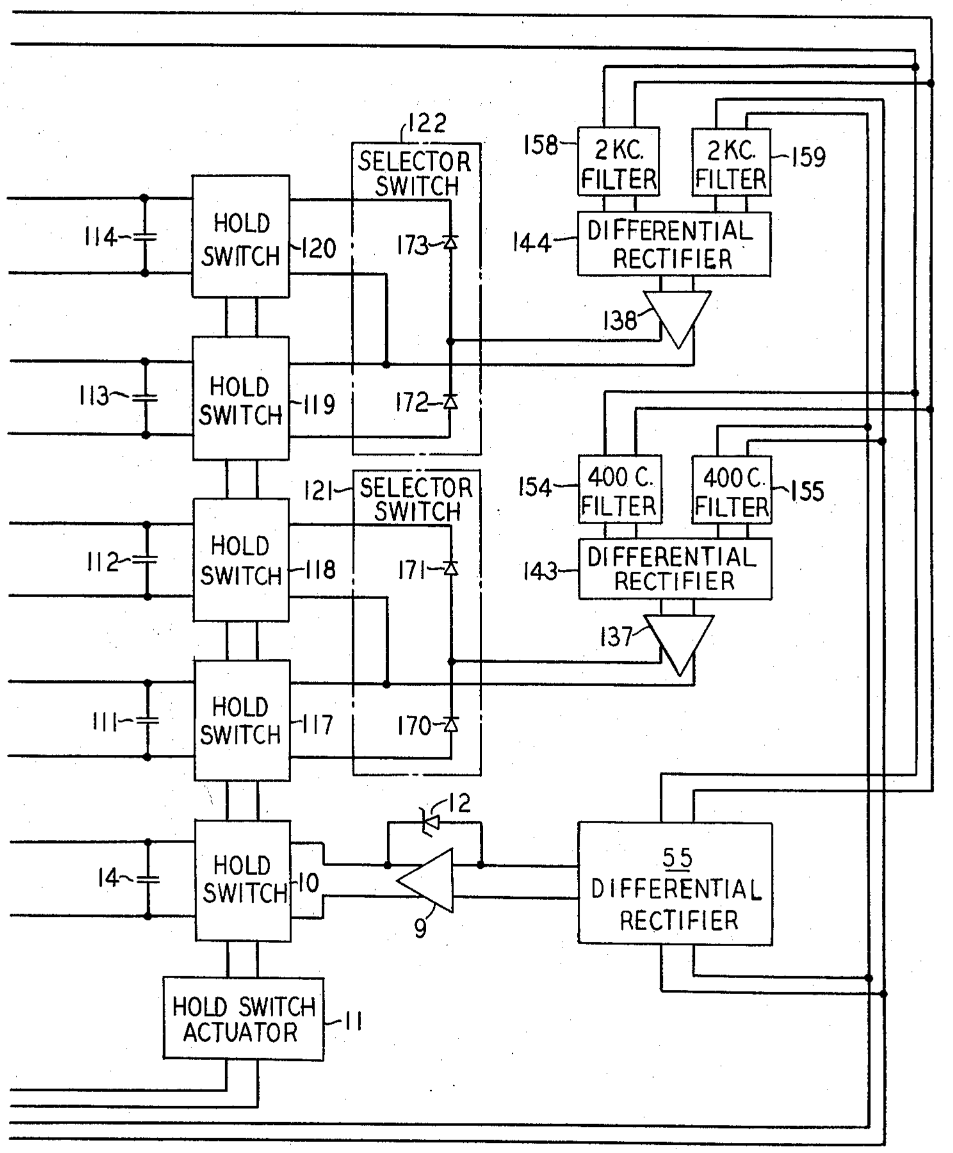
Figure 4:
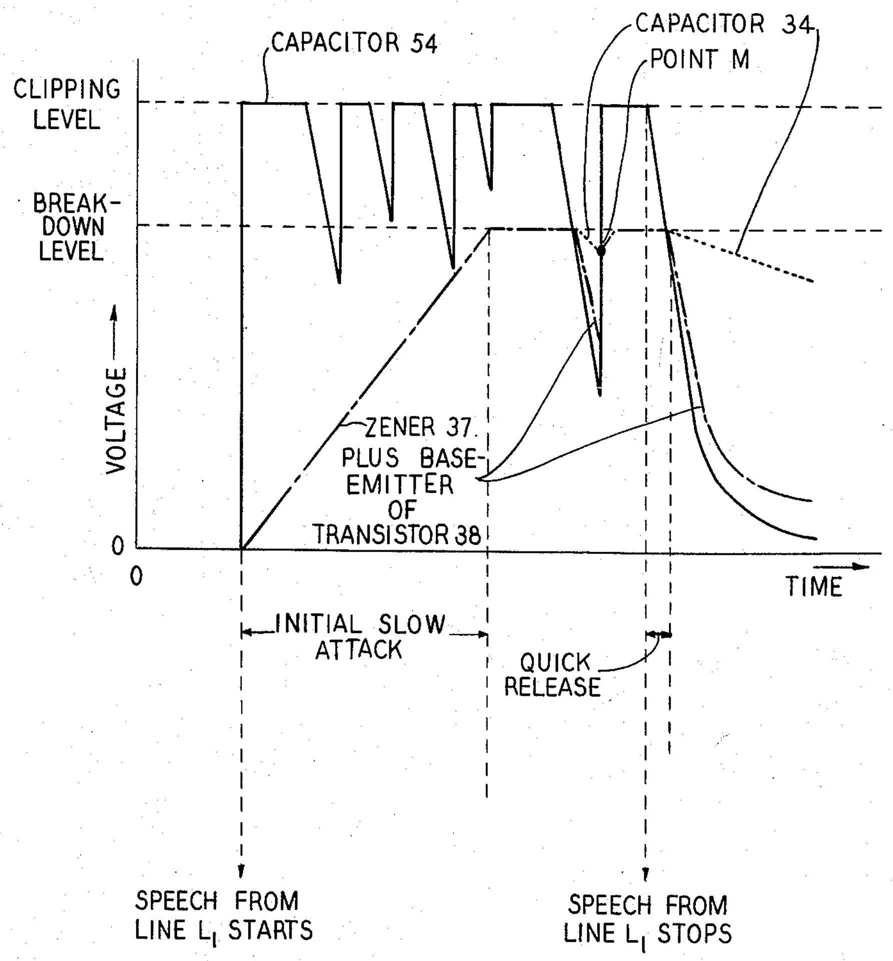

FIG. 3A and FIG. 3B together form a schematic and block diagrammatic illustration of a modification of the embodiment of FIG. 1 for distributing the variable components of the artificial balancing impedance among electrically isolated locations; and FIG. 4 shows curves which are useful in understanding the operation of hold switch 10 and actuator 11 of FIG. 1A.

In FIG. 1, line $L_3$ is a two-way, two-wire line; while lines $L_1$ and $L_2$ are oppositely directed one-way lines of a four-wire adjoining link. Such an adjoining link may be a subscriber telephone set or may provide amplification intermediately in a telephone connection by means of amplifiers 1 and 2. Four wires are made necessary by the unilateral transmission characteristics of amplifiers 1 and 2. Amplifier 2 is connected in line $L_2$ with an orientation to amplify signals traveling away from line $L_3$. Amplifier 1 is connected in line $L_1$ with an orientation to amplify signals traveling toward line $L_3$.

Conjugate network 3 couples lines $L_1$, $L_2$ and $L_3$ to enable signal transmission from line $L_3$ to line $L_2$ and from line $L_1$ to line $L_3$. Conjugate network 3 possesses the characteristic of transmitting signals from terminal A and A′ to terminals C and C′ and to terminals D and D′. Conjugate network 3 can also transmit signals from terminals C and C′ to terminals B and B′. But, when the impedance 4 connected to terminals D and D′ balances the impdeance connected to terminals C and C′, conjugate network 3 cannot transmit signals from terminals A and A′ to terminals B and B′. Line $L_3$ is connected to terminals C and C′, the input of amplifier 2 in line $L_2$ to terminals B and B′, the output of amplifier 1 in line $L_1$ to terminals A and A′ and electrically biased artificial balancing impdeance 4 to terminals D and D′.

Where lines $L_1$ and $L_2$ are intermediately located in a long distance connection, a similar junction will join them to another two-wire line at their other ends which are not shown.

An automatic control feedback loop for adjusting artificial balancing impedance 4 comprises differential rectifier 55, direct-current amplifier 9 with its associated limiter 12, hold switch 10 with its associated hold switch actuator 11 and bias-holding capacitor 14 with its associated dynamic range restorer 13. A first input of differential rectifier-filter 55 is connected across line $L_3$ and a second input of rectifier 55 is connected across terminals D and D′ of conjugate network 3. The input of direct-current amplifier 9 is connected across the output of differential rectifier 55. Limiter 12 is connected from the output to the input of direct-current amplifier 9. Limiter 12 is a Zener diode with its cathode, or N-type region, connected to one terminal of the output of amplifier 9 and its anode, or P-type region, connected to one terminal of the input of amplifier 9. The other output terminal and the other input terminal of amplifier 9 are fixed in potential with respect to each other. It will be noted that the orientation of nonsymmetrical limiter 12 is chosen to complement the orientation of the base-emitter circuit of n-p-n transistor 22 in artificial balancing impedance 4 so that the output of amplifier 9 is adapted to promote conduction in the base-emitter circuit of transistor 22.

Hold switch 10 is connected between the output of direct-current amplifier 9 and the feedback signal input of artificial balancing impedance 4 to make and break the electrical connection between them. One terminal of the feedback signal input of impedance 4 is the base of transistor 22 and the other is terminal D′ of conjugate network 3. Hold switch 10 has an input for switching signals which is connected across the output of hold switch actuator 11. The input of hold switch actuator 11 is connected across the output of amplifier 1 in line $L_1$. Capacitor 14 and dynamic range restorer 13 are connected in parallel across the feedback signal input of artificial balancing impedance 4.

Artificial balancing impedance 4 includes, according to the invention, an arrangement of nonlinear impedance elements 18 and 19 for responding to signals applied to the feedback signal input of amplfiier 9. Elements 18 and 19 are preferably varistors. According to a first feature of the invention, the aforesaid arrangement is connected in a balanced fashion to terminals D and D′ of conjugate network 3.

Specifically, according to the invention, nonlinear impedance elements 18 and 19 are connetced in series between the emitter and collector of transistor 22. That is, one side of varistor 18 is connected to the collector of transistor 22, one side of varistor 19 is connected to the emitter of transistor 22, and the other sides of varistors 18 and 19 are connected together. Resistor 21 is connected between the emitter of transistor 22 and terminal D′ of conjugate network 3. One side of resistor 20 is connected to the collector of transistor 22, and the other side of resistor 20 is connected to the positive terminal of voltage source 23. The negative terminal of source 23 is connected to terminal D′ of conjugate network 3. It should be obvious that, if transistor 22 were a p-n-p transistor, the polarities of source 23 and limiter 12 would be reversed.

According to the aforesaid first feature of the invention, the junction between nonlinear impedance elements 18 and 19 is connected to terminal D of conjugate network 3.

It will be noted that the collector-emitter current path of transistor 22 is a variable current shunt across varistors 18 and 19, as viewed from source 23. Moreover, as viewed from terminals D and D′ of conjugate network 3, varistor 18 is a portion of an impedance including itself and resistor 20 which is substantially in parallel with another impedance including varistor 19 and resistor 21. Resistor 21 is chosen so that impedance 4 has a high input impedance at its bias signal input terminals.

In operation, as the impedance of line $L_3$ changes, the impedance of artificial balancing impedance 4 appearing between terminals D and D′ of conjugate network 3 is adjusted by a feedback signal from direct-current amplifier 90 so that, as signals are transmitted from line $L_1$ to line $L_3$, no signal is returned along line $L_2$ as echo or sidetone. Effective signal transmission from line $L_1$ to line $L_2$ is prevented when artificial balancing impedance 4 has a particular impedance value in relation to the impedance of line $L_3$. This particular impedance value is said to balance line $L_3$.

If the impedance value of artificial balancing impedance 4 differs from the aforesaid particular value, a signal applied at terminals A and A′ by amplifier 1 will produce some signal at terminals B and B′, with the magnitude of the later signal becoming greater as the impedance value of impedance 4 departs further from the aforesaid particular value. As the echo or sidetone in line $L_2$ becomes more objectionable, there are correspondingly increasing differences in magnitude and phase between the alternating-current signal appearing on line $L_3$ and the alternating current signal across impedance 4 at terminals D and D′.

These signals are rectified by differential rectifier 55; and the magnitude difference between the two rectified signals is also detected by differential rectifier 55 and applied to the input of direct-current amplifier 9. The output of direct-current amplifier 9 is limited to a polarity which is positive at the cathode of Zener diode 12 and which also forward biases n-p-n transistor 22 when hold switch 10 is closed. Further, the magnitude of the output of amplifier 9 in this polarity is limited by Zener diode 12, which provides nonlinear feedback throughout this signal range. If, for example, amplifier 9 includes transistor amplifiers, saturation of these transistor amplifiers by large input signals is avoided. Differential rectifier 55 and amplifier 9 are adjusted so that, when the rectified magnitudes of the alternating-current signals across line $L_3$ and impedance 4 are exactly equal, the output of amplifier 9 is precisely in the middle of the limiting range of limiter 12. It follows that the output of amplifier 9 departs from this median value when the two aforesaid rectified signals are unequal.

When hold switch 10 is closed the output of direct-current amplifier 9 is applied through hold switch 10 to the feedback signal input of artificial balancing impedance 4, to the signal-holding capacitor 14, and to dynamic range restorer 13, all in parallel. The current shunted around varisors 18 and 19 by the collector-emitter path of transistor 22 is changed in a direction which will change the current through both of varistors 18 and 19 to increase the impedance of both if the rectified magnitude of the alternating-current signal across impedance 4 is smaller than the rectified magnitude of the alternating-current signal across line $L_3$. Conversely, the impedance of varistors 18 and 19 will be decreased if the rectified magnitude of the alternating-current signal across impedance 4 is greater than the rectified magnitude of the signal across line $L_3$. The impedance of impedance 4 between terminals D and D′ will vary in the same direction as the impedance of varistors 18 and 19. This variation will reduce the difference between the rectified magnitudes of the alternating-current signals across line $L_3$ and across impedance 4. The reduction may generally be improved for most systems if impedance 4 includes some complex components characteristic of the majority of probable lines $L_3$.

It will be noted that differential rectifier 55, amplifier 9, hold switch 10, actuator 11, dynamic range restorer 13, capacitor 14, and transistor 22 are means for responding to alternating-current signals across line $L_3$ and artificial balancing impedance 4 to adjust impedance 4 to balance line $L_3$.

At equilibrium the alternating-current signals across line $L_3$ and artificial balancing impedance 4 will differ by just the amount needed to sustain the existing bias signal applied between the base of transistor 22 and terminal D′ of conjugate network 3.

An additional advantage of the invention derives from the shunting arrangement of transistor 22 with respect to varistors 18 and 19. The variation of direct-current potential between the base of transistor 22 and terminal D′ does not substantially affect the direct-current potential between terminals D and D′. As the current in the collector-emitter path of transistor 22 changes, the direct current in varistor 18 must change in the same direction as the direct current in varistor 19. Therefore, the direct-current voltage drops in varistors 18 and 19 must change in the same direction. Since the sum of the direct-current voltage drops across varistor 18, varistor 19, resistor 20, and resistor 21 must equal the voltage of source 23, the direct-current voltage on resistor 21 must vary in the opposite direction from the direct-current voltage on varistor 19. Thus, variations in direct-current voltage across varistor 19 tend to be compensated with respect to terminals D and D′ by the variation in direct-current voltage across resistor 21.

According to a first feature of the invention, nonlinear distortion is substantially avoided by the balanced arrangement of nonlinear impedance elements which artificial balancing impedance 4 presents at terminals D and D′ of conjugate network 3. By virtue of the connection of the junction between varistors 18 and 19 to terminal D of conjugate network 3, alternating currents flowing between terminals D and D′ through impedance 4 divide between the impedance branch including varistor 18 and the impedance branch including varistor 19 and decrease the current flowing through one varistor when they increase the current flowing through the other varistor. These opposed variations are the result of the direction of direct-current flow through varistors 18 and 19 from source 23. That is, one portion of the alternating current flows through one of varistors 18 and 19 in additive polarity with the current from source 23; and another portion of the alternating current flows through the other of varistors 18 and 19 in subtractive polarity with the current from source 23. These opposed variations of current cause mutually compensating variations of the impedances of varistors 18 and 19 and of the parallel impedance branches in which they are located. The cyclic variation of impedance between terminals D and D′ is relatively insignificant in comparison to the individual cyclic variations of the impedances of varistors 18 and 19.

Thus far, the operation of the embodiment of FIG. 1 has been discussed as if the adjustment of artificial balancing impedance 4 were continuous. However, whenever signals are transmitted from line $L_3$ to line $L_2$, the tendency of differential rectifier 55 and direct-current amplifier 9 would be to drive the value of impedance 4 away from the particular value which balances line $L_3$.

According to a second feature of the invention, hold switch 10 and hold switch actuator 11 prevent this result. Whenever hold switch actuator 11 ceases to receive signals from amplifier 1 in line $L_1$, hold switch actuator 11 causes hold switch 10 to open the connection between direct-current amplifier 9 and the feedback signal input of artificial balancing impedance 4.

If the then-existing signal stored on capacitor 14 is within a normal operating range determined by dynamic range restorer 13, the discharge time constant of capacitor 14 is greatly increased so that impedance 4 is held near the particular value which balances line $L_3$. Specifically, capacitor 14 discharges slowly through resistor 21 and the base-emitter junction of transistor 22.

According to a third feature of the invention, if the then existing signal stored on capacitor 14 is not within the normal operating range to which dynamic range restorer 13 is set, dynamic range restorer 13 returns the signal to the nearest limit of the normal operating range. The normal operating range is well within the limits established by limiter 12. Further details of dynamic range restorer 13 will be described hereinafter.

Whenever hold switch actuator 11 recommences to receive appreciable signals from amplifier 1 in line $L_1$, hold switch 10 is reclosed. Artificial balancing impedance 4 is then readjusted.

Further details of hold switch 10 and hold switch actuator 11 are illustrated in FIG. 1A.

Hold switch 10 is a solid-state electronic switch including n-p-n transistors 28 and 29 connected back-to-back; that is, the emitter of transistor 28 is connected to the collector of transistor 29, and the emitter of transistor 29 is connected to the collector of transistor 28. The emitter of transistor 28 is further connected to an output terminal of direct-current amplifier 9 at the cathode of limiter 12, and the collector of transistor 28 is further connected to the base of transistor 22. The base electrode of transistor 28 is connected to one side of resistor 30. The other side of resistor 30 is connected to the positive terminal of voltage source 31, and the negative terminal of source 31 is connected to the other output terminal of amplifier 9 and to terminal D′ of conjugate network 3. The base electrode of transistor 29 is connected to one side of resistor 32; and the other side of resistor 32 is connected to the positive terminal of source 31. The base electrode of transistor 28 and the negative terminal of source 31 comprise one switching signal input of hold switch 10. The base electrode of transistor 29 and the negative terminal of source 31 comprise another switching signal input of hold switch 10.

The input of hold switch actuator 11 is connected across the output of amplifier 1 in line $L_1$, and the twin outputs of actuator 11 are each connected to one of the aforesaid switching signal inputs of hold switch 10.

Specifically, the input of amplifier-clipper 33 is connected across the output of amplifier 1 in line $L_1$. Amplifier-clipper 33 may be typical apparatus for producing a square wave from an alternating-current wave. The output of amplifier-clipper 33 is connected to the input of half-wave rectifier 66. That is, anode of diode 64 is connected to one terminal of the output of amplifier-clipper 33; and the cathode of diode 64 is connected to one terminal of capacitor 54. The other terminal of capacitor 54 is connected to the other terminal of the output of amplifier-clipper 33. Resistor 56 is connected in parallel with capacitor 54.

It will be understood that, wherever diodes are used in the circuitry described herein, any nonreciprocally conducting device might also be used. When a semiconductor diode is used, its "anode" might also be described as a "P-type region" and its "cathode" as an "N-type region."

The values of capacitor 54 and resistor 56 are chosen so that their product is significantly smaller than that used in similar positions in conventional rectifier-filter circuits.

A series timing circuit comprising a resistor 57, a capacitor 34, and a nonreciprocally conducting device 35 is connected across the output of rectifier 66. Device 35 is characterized by less resistance to current produced by an increasing output voltage of rectifier 66 than to a decreasing output voltage of rectifier 66.

Specifically, device 35 is shown as a diode and is shunted by a resistance 36 which makes the apparent reverse resistance of the device 35 constant and predictable. The parallel combination of device 35 and resistance 36 is characterized by less resistance to current produced by an increasing output voltage of rectifier 66 than to a decreasing output voltage of rectifier 66.

One terminal of resistor 57 is connected to the cathode of diode 64, and the other terminal is connected to one terminal of capacitor 34. The other terminal of capacitor 34 is connected to the anode of diode 35. The cathode of diode 35 is connected to the terminal of capacitor 54 which is not connected to diode 64. The product of the resistance of resistor 57 and the capacitance of capacitor 34 is greater, for example, ten times greater, than the corresponding product for capacitor 54 and resistor 56. The resistance of resistor 36 is greater, for example, ten times greater, than the resistance of resistor 57.

According to a fourth feature of the invention, the input of a voltage-sensitive switching circuit is connected across the series combination of capacitor 34 and nonreciprocally conducting device 35.

Specifically, the cathode of Zener diode 37 is connected to the junction between capacitor 34 and resistor 57. The anode of Zener diode 37 is connected to the base electrode of n-p-n transistor 38. The emitter electrode of transistor 38 is connected to the cathode of diode 35. Resistor 39 is connected between the collector electrode of transistor 38 and the positive terminal of source 40. The negative terminal of source 40 is connected to the emitter of transistor 38.

The base electrodes of n-p-n transistors 58 and 59 are connected to the collector of transistor 38; and their emitter electrodes are connected to the emitter of transistor 38 and to the negative terminal of source 31 in hold switch 10. The collector electrode of transistor 58, which provides one ouptut channel for actuator 11, is connected to the base of transistor 28 in hold switch 10. The collector electrode of transistor 59, which provides the other output channel for actuator 11, is connected to the base of transistor 29.

In the operation of hold switch 10 and actuator 11, speech signals in line $L_1$ are amplified and clipped into square waves by amplifier-clipper 33. The square waves are variable in period because each half-period corresponds to a time between successive nulls of the speech wave. Half waves of one polarity are rectified by rectifier 66, producing a voltage across capacitor 54 and resistor 56 as illustrated by the solid curve in FIG. 4, which will be more fully explained hereinafter.

When speech waves initially commence in line $L_1$, it is desirable to allow transients in amplifier 9 and the preceding feedback circuitry to dinish before hold switch 10 is closed. These transients may be due to speech waves in line $L_3$, which precede or overlap the speech waves from line $L_1$ such overlapping being caused by the interruption of the party at the other end of line $L_3$ by the party at the other end of line $L_1$. Transients also arise from preceding quiescence of the circuitry.

Therefore, although capacitor 54 charges immediately, capacitor 34 charges slowly through resistor 57 and diode 35. The combined voltage across Zener diode 37 and the base-emitter junction of transistor 38, which is substantially the voltage across capacitor 34 during this phase of operation, is shown by the broken curve of dashes and dots in FIG. 4. After a time duration which applicant designates the "Initial Slow Attack," the aforesaid combined voltage reaches a level at which substantial conduction through Zener diode 37 and the base-emitter junction of transistor 38 commences. This is designated the "Breakdown Level" in the curves of FIG. 4. At the commencement of base current, transistor 38 saturates. The potentials of the base electrodes of transistors 58 and 59 fall so that transistors 58 and 59 are either cut off or acquire a relatively high collector-to-emitter impedance. The potential of the base electrodes of transistors 28 and 29 rise as the currents through resistors 30 and 32, respectively, decrease; and these base potentials surpass the maximum possible potentials at the output of amplifier 9 and across capacitor 14, respectively, so that the base-emitter junctions of both transistors 28 and 29 are forward biased. Transistors 28 and 29 saturate; and the output of direct-current amplifier 9 is connected with the feedback signal input of artificial balancing impedance 4 through the back-to-back emitter-collector circuits of transistors 28 and 29 which allow current to pass in either direction. Artificial balancing impedance 4 is now adjusted, as described hereinbefore, to balance line $L_3$.

The dual channel drive scheme has been found desirable because extreme voltage differences beteween capacitor 14 and the output of amplifier 9 will cause current to flow from the base to the collector of either transistor 28 or 29. If both bases are connected together, this abnormal conduction will increase the voltage drop across resistor 30 or 32 to drive down the potential of the base of the transistor which is conducting normally until its collector current is undesirably limited. Separate drive transistors help to prevent such depression of the base potential of the normally conducting transistor.

The special cooperation of the fourth feature of the invention lies in obtaining a quick release or opening of hold switch 10 when the speech wave in line $L_1$ terminates. It is at once apparent that the voltage on capacitor 54 must decay rapidly if actuator 11 is not to respond sluggishly. Resistor 56 allows this rapid decay, as illustrated by the solid curve of FIG. 4. However, the voltage on capacitor 34 need not and, indeed, should not decay equally rapidly. It decays slowly, as shown by the dotted curve of FIG. 4, because of the high value of resistor 36. While capacitor 34 is discharging, the fourth feature of the invention makes unique use of the high value of resistor 36 in relation to resistor 57 by subtracting its voltage drop, which is substantially all of the voltage difference between capacitor 54 and capacitor 34, from the slowly decaying voltage of capacitor 34 at the input of the following voltage-sensitive switching circuitry. That is, the difference between the voltages of capacitor 34 and resistor 36 is applied across Zener diode 37 and the base-emitter junction of transistor 38. As illustrated by the declining portions of the broken curve of dots and dashes in FIG. 4, the voltage across Zener diode 37 and the base-emitter junction of transistor 38 follows the voltage across capacitor 54 so rapidly that Zener diode 37 will frequently cease to conduct during the longer nonrectified half cycles, or during short breaks in the speech wave, as well as when the speech waves cease, as shown by the broken curve of dots and dashes in FIG. 4. When Zener diode 37 ceases to conduct, the base current of transistor 38 is cut off. The base potentials of transistors 58 and 59 rise, the emitter-to-collector impedances and voltages of the latter transistors fall, and the base potentials of transistors 28 and 29 fall below the voltages on capacitor 14 and at the output of amplifier 9. It will be recalled that amplifier 9 has an output in the middle of the limiting range of Zener diode 12 when it has no input signal. Thus, transistors 28 and 29 are cut off, and hold switch 10 is opened. Applicant designates the time duration required for response as "Quick Release," as shown in the broken curve of dots and dashes in FIG. 4.

When the release occurs during the speech wave on line $L_1$, hold switch 10 is opened temporarily. But, when the voltage on capacitor 54 rises again, the persisting voltage on capacitor 34 takes control of Zener diode 37 and transistor 38 because the subtracting voltage disappears, as shown by the rejoining of the dotted curve with the broken curve of dots and dashes at point M on the ascending solid curve in FIG. 4. Hold switch 10 is quickly reclosed, as described above. The adjustment of impedance 4 is resumed.

By contrast, when speech waves in line $L_1$ have ceased for an appreciable period, capacitor 54 completely discharges, so that an "Initial Slow Attack" will occur again when the speech waves resume.

Further structural details of dynamic range restorer 13 according to the third feature of the invention are also shown in FIG. 1A. Resistors 26 and 27 are each connected across voltage source 31, so that each may act as a separate voltage divider. The anode of diode 25 and the cathode of diode 24 are connected to the base of transistor 22. The cathode of diode 25 is connected to a selected point on resistor 27 and the anode of diode 24 is connected to a selected point on resistor 26.

If the voltage on capacitor 14 exceeds the voltage on the portion of resistor 27 between the cathode of diode 25 and the negative terminal of source 31, diode 25 will conduct. If hold switch 10 is open, the voltage on capacitor 14 will be reduced to a first quiescent voltage across the aforesaid portion of resistor 27. This first quiescent voltage is the upper limit of the normal operating range. If the voltage on capacitor 14 is less than the voltage on the portion of resistor 26 between the anode of diode 24 and the negative terminal of source 31, diode 24 will conduct. If hold switch 10 is open, the voltage on capacitor 14 will be increased to a second quiescent voltage across the aforesaid portion of resistor 26. The second quiescent voltage is the lower limit of the normal operating range.

If hold switch 10 is closed, amplifier 9 alone determines the voltage on capacitor 14, since the conduction of diodes 24 and 25 does not appreciably load down the output of amplifier 9.

It will be noted that dynamic range restorer 13 is particularly advantageous when line $L_3$ is transiently an open circuit or a short circuit. The party sending from line $L_1$ may drive impedance 4 to an extreme value and then will realize something is wrong and stop talking. Meanwhile, the abnormal line condition may be corrected. By bringing impedance 4 back to a normal operating range while hold switch 10 is open, dynamic range restorer 13 allows a balance to be quickly achieved without irritating audible transients when hold switch 10 is reclosed. However, if the abnormal line condition persists after hold switch 10 is reclosed, amplifier 9 overrides dynamic range restorer 13 to adjust impedance 4 to balance line $L_3$.

Structural details of differential rectifier 55 are also shown in FIG. 1A. The input of isolation amplifier 5 is connected across terminals D and D′ of conjugate network 3; and the output of amplifier 5 is connected across the input of half-wave rectifier 7. The input of isolation amplifier 6 is connected across terminals C and C′ of conjugate network 3; and the output of amplifier 6 is connected across the input of half-wave rectifier 8. One side of the output of amplifier 5 is connected to one side of the output of amplifier 6 to provide a common connection.

According to the fifth feature of the invention, half-wave rectifiers 7 and 8 include balanced rectifying arrangements, each with two branches. In rectifier 7, the first branch includes voltage source 52 with negative terminal connected to the common connection and positive terminal connected to one side of the parallel combination of resistance 49 and low-pass filter 46. The other side of the parallel combination is connected to the anode of diode 42. The cathode of diode 42 is connected to the noncommon side of the output of amplifier 5 and to the anode of diode 41 in the second branch. The cathode of diode 41 is connected to one side of low-pass filter 45, and the other side of low-pass filter 45 is connected to the common connection.

In rectifier 8, the first branch includes voltage source 53 with positive terminal connected to the common connection and negative terminal connected to one side of the parallel combination of resistance 50 and low-pass filter 47. The other side of the parallel combination is connected to the cathode of diode 43. The anode of diode 43 is connected to the noncommon side of the output of amplifier 6 and to the cathode of diode 44 in the second branch. The anode of diode 44 is connected to one side of low-pass filter 48, and the other side of low-pass filter 48 is connected to the common connection. Potentiometer 51 is connected across the outputs of both rectifiers 7 and 8 by connecting one of its fixed terminals to the cathode of diode 41 and the other of its fixed terminals to the anode of diode 44. Filter capacitor 15 is connected from the common connection to the variable tap of potentiometer 51. The input of direct-current amplifier 9 is connected in parallel with capacitor 15.

It will be noted that the first and second rectifying branches in both rectifiers 7 and 8 are oriented in opposite polarities with respect to the outputs of amplifiers 5 and 6, respectively. It will further be noted that sources 52 and 53 promote a common direct current through diodes 41, 42, 43 and 44.

In operation, the potential of the cathode of diode 41 will be above the potential of the common connection by an amount corresponding to the magnitude of the signal between terminals D and D′ of conjugate network 3; and the potential of the anode of diode 44 will be below the potential of the common connection by an amount corresponding to the magnitude of the signal between terminals C and C′ of conjugate network 3. If the variable tap is set to the midpoint of potentiometer 51, the potential of the variable tap will differ from the potential of the common connection by half of the difference between the magnitudes of the potentials at the cathode of diode 41 and at the anode of diode 44. The potential difference between the variable tap of potentiometer 51 and the common connection corresponds to the difference in magnitude of signals across line $L_3$ and artificial balancing impedance 4.

The balanced rectifying arrangements provided by the first and second branches of rectifiers 7 and 8 prevent drift of the direct-current potentials at the inputs of rectifiers 7 and 8, as would otherwise occur when the outputs of amplifiers 5 and 6 include coupling capacitors. Preventing drift is important in insuring accuracy of adjustment of impedance 4. A further advantage of this fifth feature of the invention results from biasing diodes 41, 42, 43 and 44 with the same direct current. The resultant improved matching of half-wave rectifiers 7 and 8 also improves accuracy of the system. Low-pass filters 45, 46, 47 and 48 help to provide that the gain of the feedback loop decreases to unity before the phase shift around the loop reaches 180 degrees.

Conjugate network 3 may utilize a hybrid coil similar to the hybrid coil in the above-cited patent of Doren Mitchell. However, as illustrated in FIG. 1A, conjugate network 3 may also utilize amplifiers such as p-n-p transistors 16 and 17 to perform its function, as taught by L. A. Meacham in Patent 2,762,867, issued September 11, 1956.

Transistor amplifiers 16 and 17 are connected with their inputs, that is their base-emitter junctions, in parallel across the output of amplifier 1 of the line $L_1$; and the outputs of amplifiers 16 and 17 are connected across line $L_3$ and artificial balancing impedance 4, respectively. Thus, transistor 16 is the line amplifier, and transistor 17 is line-balancing amplifier. The base electrodes of transistors 16 and 17 are connected together to terminals A′, C′ and D′ of conjugate network 3. The emitter electrodes of transistors 16 and 17 are connected to terminal A. The collector electrode of transistor 16 is connected to terminals C and B of conjugate network 3 and the collector electrode of transistor 17 is connected to terminals B′ and D of conjugate network 3.

It will be noted that the difference between the output voltages of amplifiers 16 and 17 is applied to the input of amplifier 2 of line $L_2$. Thus, when signals from line $L_1$ produce like output voltages of amplifiers 16 and 17, no signals are transmitted from line $L_1$ to line $L_2$; and artificial balancing impedance 4 is said to balance line $L_3$.

Figure 2:
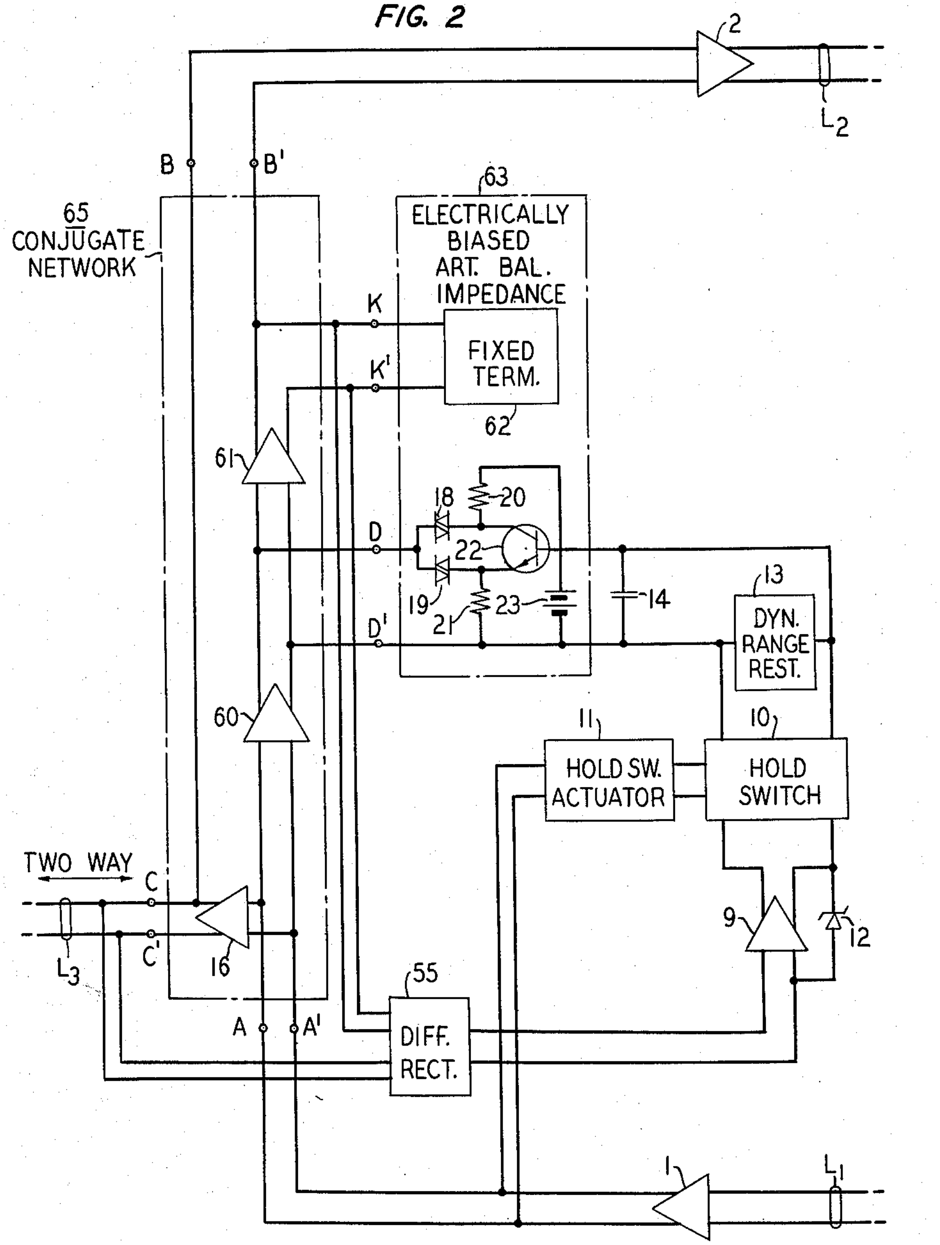
FIG. 2 is a schematic and block diagrammatic illustration of a modification of the embodiment of FIG. 1 for reducing nonlinear distortion.

FIG. 2 illustrates a modification of the embodiment of FIG. 1 for further reducing nonlinear distortion arising from the effects of alternating-current signals upon nonlinear impedance elements 18 and 19. All components shown in FIG. 2 which bear the same numeral as a component shown in FIG. 1 or in FIG. 1A may be the same as shown and described for that component in the embodiment of FIG. 1.

Conjugate network 65 includes the cascaded amplifiers 60 and 61 for producing the signal which is to be compared with the signal across line $L_3$. The input of low-gain amplifier 60 is connected in parallel with the input of line amplifier 16. The output of amplifier 60 is connected to the input of line-balancing amplifier 61. One terminal of the output of amplifier 60 is connected to terminal D of conjugate network 65, and the other terminal of the output of amplifier 60 is connected to terminal D′ of conjugate network 65. Fixed termination 62 and one input of differential rectifier 55 are connected in parallel across the output of amplifier 61 at terminals K and K′. The other input of differential rectifier 55 is connected across line $L_3$ at terminals C and C′. Terminal K is connected to terminal B′ of conjugate network 65. Terminals A′, C′, D′ and K′ are fixed in potential with respect to each other.

According to a sixth feature of the invention, introdufiction of the nonlinear varistor elements 18 and 19 at terminals D and D′ between cascaded or tandem amplifiers 60 and 61 allows the ratio of the alternating-current magnitude to the direct-current magnitude in elements 18 and 19 to be smaller than in the embodiment of FIG. 1. Nonlinear distortion is thereby reduced.

Further modifications of the embodiment of FIG. 1 are illustrated in the circuit of FIGS. 3A and 3B. According to a seventh feature of the invention, these modifications distribute the variable components of electrically biased artificial balancing impedance 165 among a plurality of electrically isolated locations. Conjugate network 166 is now an eight port network with five ports devoted to the connection of artificial balancing impedance 165. Network 166 is conjugate in that, when artificial balancing impedance 165 balances line $L_3$ no signals may be transmitted from terminals A and A′ to terminals B and B′. The input of amplifier 71 is connected in parallel with the input of amplifier 16. The output of amplifier 71 is connected to the input of amplifier 72 at terminals D and D′, which correspond to the same terminals in FIG. 1 except that no input of digerential rectifier 55 is now connected to them. That is, a network identical to electrically biased artificial balancing impedance 4 of FIG. 1 is connected to terminals D and D′. One input of differential rectifier 55 is connected to the output of isolation amplifier 130; and the input of amplifier 130 is connected to terminals C and C′. The other input of differential rectifier 55 is connected to the output of isolation amplifier 133; and the input of amplifier 133 is connected to terminals H and H′. Direct-current amplifier 9, Zener diode 12, hold switch 10, actuator 11, capacitor 14 and all of their connections are the same as in FIG. 1.

The further modification of the embodiment of FIG. 1 according to the seventh feature of the invention illustrated in FIGS. 3A and 3B involve the circuitry between terminals D and D′ and terminals H and H′. In FIG. 3A amplifiers 71, 72, 73, 74 and 75 are cascaded. That is, the output of amplifier 72 is connected to the input of amplifier 73 at terminals E and E′. The output of amplifier 73 is connected to the input of amplifier 74 at terminals F and F′. The output of amplifier 74 is connected to the input of amplifier 75 at terminals G and G′. The output of amplifier 75 is connected to terminals H and H′. Terminals A′, C′, D′, E′, F′, G′ and H′ are fixed in potential with respect to each other. Terminal B′, which is one of the input terminals of amplifier 2 in line $L_2$, is connected to terminal H. Thus, amplifiers 71 through 75 may be called cascaded line-balancing amplifiers.

The nonlinear impedance networks introduced between amplifiers 72, 73, 74 and 75 and after amplifier 75 are analogous to the impedance network introduced between amplifiers 71 and 72.

Specifically, varistors 82 and 83 are connected in series between the collector and emitter of n-p-n transistor 101. The junction between varistors 82 and 83 is connected to terminal E. One side of resistor 92 is connected to the collector of transistor 101. The other side of resistor 92 is connected to the positive terminal of voltage source 106. The negative terminal of voltage source 106 is connected to terminal E′. Resistor 93 is connected from the emitter of transistor 101 to terminal E′. Capacitor 111 and the output of hold switch 117 in FIG. 3B are connected in parallel from the base of transistor 101 to terminal E′ in FIG. 3A. Inductor 76 is connected from terminal E to terminal E′.

In FIG. 3A varistors 84 and 85 are connected in series between the collector and emitter of n-p-n transistor 102. The junction between varistors 84 and 85 is connected to one terminal of capacitor 77. The other terminal of capacitor 77 is connected to terminal F. One side of resistor 94 is connected to the collector of transistor 102. The other side of resistor 94 is connected to the positive terminal of source 107. The negative terminal of source 107 is connected to terminal F′. Resistor 95 is connected from the emitter of transistor 102 to terminal F′. Capacitor 112 and the output of hold switch 118 in FIG. 3B are connected in parallel from the base of transistor 102 to terminal F′ in FIG. 3A.

In FIG. 3A varistors 86 and 87 are connected in series between the collector and emitter of n-p-n transistor 103. The junction between varistors 86 and 87 is connected to terminal G. One side of resistor 96 is connected to the collector of transistor 103. The other side of resistor 96 is connected to the positive terminal of voltage source 108. The negative terminal of voltage source 108 is connected to terminal G′. Resistor 97 is connected between the emitter of transistor 103 and terminal G′. Capacitor 113 and the output of hold switch 119 in FIG. 3B are connected in parallel from the base of transistor 103 to terminal G′ in FIG. 3A. Capacitor 78 is connected from terminal G to terminal G′.

In FIG. 3A varistors 88 and 89 are connected in series between the collector and the emitter of n-p-n transistor 104. The junction between varistors 88 and 89 is connected to one terminal of inductance 79, and the other terminal of inductance 79 is connected to terminal H. One side of resistor 98 is connected to the collector of transistor 104, and the other side of resistor 98 is connected to the positive terminal of voltage source 109. The negative terminal of voltage source 109 is connected to terminal H'. Resistor 99 is connected between the emitter of transistor 104 and terminal H'. Capacitor 114 and the output of hold switch 120 in FIG. 3B are connected in parallel from the base of transistor 104 to terminal H' in FIG. 3A.

Hold switches 10, 117, 118, 119 and 120 in FIG. 3B are connected together so that hold switches 117, 118, 119 and 120 are constructed and operated in the same manner as hold switch 10. The construction and operation of hold switch 10 was described hereinbefore in connection with FIG. 1 and FIG. 1A.

One input terminal of hold switch 117 and one input terminal of hold switch 118 are connected together to one output terminal of direct-current amplifier 137. The other input terminal of hold switch 117 is connected to the anode of diode 170, and the other input terminal of hold switch 118 is connected to the cathode of diode 171. The cathode of diode 170 and the anode of diode 171 are connected together to the other output terminal of direct-current amplifier 137. The input of direct-current amplifier 137 is connected to the output of differential rectifier 143. One input of differential rectifier 143 is connected to the output of 400-cycle filter 154. The input of filter 154 is connected to the output of amplifier 133 in FIG. 3A. The other input of differential rectifier 143 is connected to the output of 400-cycle filter 155. The input of filter 155 is connected to the output of amplifier 130 in FIG. 3A.

It will be noted that diode 170 is oriented so that signals passed by it promote conduction in transistor 101, and diode 171 is oriented so that signals passed by it promote conduction in transistor 102.

One input terminal of hold switch 119 and one input terminal of hold switch 120 are connected together to one output terminal of direct-current amplifier 138. The other input terminal of hold switch 119 is connected to the anode of diode 172, and the other input terminal of hold switch 120 is connected to the cathode of diode 173. The cathode of diode 172 and the anode of diode 173 are connected together to the other output terminal of direct-current amplifier 138. The input of direct-current amplifier 138 is connected to the output of differential rectifier 144. One input of differential rectifier 144 is connected to the output of two-kilocycle filter 158. The input of filter 158 is connected to the output of amplifier 133. The other input of differential rectifier 144 is connected to the output of two-kilocycle filter 159. The input of filter 159 is connected to the output of amplifier 130.

It will be noted that diode 172 is oriented so that signals passed by it promote conduction in transistor 103, and diode 173 is oriented so that signals passed by it promote conduction in transistor 104.

Dynamic range restorers may be introduced in association with capacitors 14, 111, 112, 113 and 114 in the same manner that dynamic range restorer 13 is associated with capacitor 14 of FIG. 1.

Amplifiers 137 and 138 may use negative feedback with nonlinearities similar to the feedback provided by Zener diode 12 of amplifier 9. However, such devices must be biased and paired so that amplifiers 137 and 138 produce symmetrical, bipolar outputs instead of the unipolar output of amplifier 9.

Differential rectifiers 143 and 144 are constructed in the same manner as, and operate in the same balanced and stabilized manner as, rectifier 55 of FIG. 1.

The operation of the modified embodiment of FIG. 3 differs from the operation of the embodiment of FIG. 1 in that there are three degrees of freedom in the variation of artificial balancing impedance 165, as compared to one degree of freedom in the variation of impedance 4 of FIG. 1. The additional degrees of freedom result from the distribution of the nonlinear elements of impedance 165 among the stages of amplification of amplifiers 71, 72, 73, 74 and 75. Each set of nonlinear impedance elements is isolated from the other sets of nonlinear impedance elements by at least one amplifier, which thus performs a buffering function, as well as providing part of the gain necessary to produce a signal at terminals H and H' equal in magnitude to the signal at terminals C and C'. In accordance with this feature of the invention, the variation of the load impedance of each of amplifiers 71, 72, 73, 74 and 75 has minimal effect upon the load impedance of any of the other amplifiers.

Inductor 76 in the load of amplifier 72 in FIG. 3A cooperates with varistors 82 and 83 to provide a variable inductive effect at 400 cycles per second. A similar effect might be provided with other solid-state elements if nonlinear saturable inductive elements each in series with a resistance shunted by an alternating-current by-pass capacitor were substituted for varistors 82 and 83, a resistance were substituted for inductor 76, and a reversal of polarity or direction of variation of the bias were provided, for example, by substituting for transistor 101 a p-n-p transistor with an emitter battery promoting its conduction. Capacitor 77 in the load of amplifier 73 in FIG. 3A cooperates with varistors 84 and 85 to provide a variable capacitive effect at 400 cycles per second. A similar effect might be provided with other solid-state elements if semiconductor junctions with voltage-variable capacitance, each in series with a resistance, were substituted for varistors 84 and 85 and capacitor 77 were removed.

Capacitor 78 in the load of amplifier 74 in FIG. 3A cooperates with varistors 86 and 87 to provide a variable capacitive effect at two kilocycles per second. A similar effect might be provided with other solid-state elements if semiconductor junctions with voltage-variable capacitance were substituted for varistors 86 and 87 and a resistance were substituted for capacitor 78. Inductor 79 in the load of amplifier 75 in FIG. 3A cooperates with varistors 88 and 89 to provide a variable inductive effect at two kilocycles per second. A similar effect might be provided with other solid-state elements if nonlinear saturable inductive elements each in series with a resistance were substituted for varistors 88 and 89, inductor 79 were removed, and a reversal of polarity or direction of variation of the bias were provided, for example, by substituting for transistor 104 a p-n-p transistor with an emitter battery promoting its conduction.

The design of the balanced impedance loads of amplifiers 72, 73, 74 and 75 for the most effective variation at the frequencies of 400 cycles per second and two kilocycles per second may be accomplished with gain-phase diagrams, sometimes called Bode diagrams. See H. W. Bode, Network Analysis and Feedback Amplifier Design, Van Nostrand, 1945, pp. 196–225, and G. J. Murphy, Basic Automatic Control Theory, 1957, pp. 243–259.

Amplifiers 130 and 133 in FIG. 3A, filters 154, 155, 158 and 159 and differential rectifiers 55, 143 and 144 in FIG. 3B comprise means for detecting differences between the output of line amplifier 16 and the output of amplifier 75 of the cascaded line-balancing amplifiers 71, 72, 73, 74 and 75. More specifically, differential rectifier 55 detects the overall magnitude difference of the rectified output signals of amplifiers 16 and 75. Four-hundred-cycle filters 154 and 155 select the 400-cycle components of the outputs of amplifiers 16 and 75 and apply those compounds to differential rectifier 143, which detects a second difference between the outputs of amplifiers 16 and 75. Two-kilocycle filters 158 and 159 select the two-kilocycle components of the outputs of amplifiers 16 and 75 and apply those components to differtial rectifier 144, which detects a third difference between the outputs of amplifiers 16 and 75.

All of the circuitry between the two outputs of rectifiers 55, 143 and 144 in FIG. 3B, on the one hand, and artificial balancing impedance 165 in FIG. 3A, on the other hand, comprise means for applying the three direct-current signals to artificial balancing impedance 165 to change its magnitude to reduce the detected differences.

More specifically, direct-current amplifier 9, hold switch 10 and capacitor 14 apply the output of rectifier 55 between the base of transistor 22 and terminal D′ to change the impedance between terminals D and D′ to reduce the first detected difference.

Direct-current amplifier 137, selector switch 121, hold switches 117 and 118, and capacitors 111 and 112 apply the output of rectifier 143 either between the base of transistor 101 and terminal E′ or between the base of transistor 102 and terminal F′ to change either the impedance between terminals E and E′ or between the terminals F and F′ to reduce the second detected difference. That is, amplifier 137 amplifies the output of rectifier 143. When the output of amplifier 137 is in a first signal range, diode 170 in selector switch 121 passes it to hold switch 117, which when closed will apply it to capacitor 111 and transistor 101; and diode 171 blocks it from hold switch 118. When the output of amplifier 137 is in a second signal range of the opposite polarity to the first signal range, diode 171 in selector switch 121 passes it to hold switch 118, which when closed will apply it to capacitor 112 and transistor 102; and diode 170 blocks it from hold switch 117.

The operation of direct-current amplifier 138, selector switch 122, hold switches 119 and 120 and capacitors 113 and 114 in applying the output of rectifier 144 to change either the impedance between terminals G and G′ or between terminals H and H′ to reduce the third detected difference is similar to the operation described above in applying the output of rectifier 143 to reduce the second detected difference.

In general, reduction of echoes and sidetone may be further improved by introduction of a still greater number of degrees of freedom in the variation of artificial balancing impedance 165.

In all respects other than those just discussed, the operation of the embodiment of FIG. 3 is analogous to the operation of the embodiment of FIG. 1.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A two-way communication system comprising
- a first line for transmitting signals in one direction only,
- a second line for transmitting signals in one direction only,
- a third line for transmitting signals in either of two directions,
- a junction for connecting said first line to said third line to transmit signals into said third line and for connecting said second line to said third line to receive signals from said third line, including a nonlinear impedance connected within said junction for preventing signal transmission from said first line to said second line when said nonlinear impedance receives signals from said first line equal to the signals received by said third line from said first line, said nonlinear impedance comprising a plurality of nonlinear elements arranged for producing an impedance value of said nonlinear impedance corresponding to the magnitude of a direct current flowing through said impedance and simultaneously for dividing alternating currents flowing through said nonlinear impedance into portions flowing separately through said elements to produce a mutually compensating effect on said impedance value,
- and means for sensing differences between signals received by said third line from said first line and signals received by said nonlinear impedance from said first line and for utilizing said differences to vary the magnitude of said direct current flowing through said nonlinear impedance to reduce said differences.

2. In combination in a telephone system, means for connecting a two-wire line to an adjoining link, comprising
- an artificial balancing impedance including at least one balanced arrangement of nonlinear impedance elements,
- a first amplifying means for applying a signal originating in said adjoining link to said two-wire line,
- a scond amplifying means for applying said signal originating in said adjoining link to said artificial balancing impedance,
- a first means for rectifying signals applied to said two-wire line by said first amplifying means to produce a first direct-current signal,
- a second means for rectifying signals applied to said artificial balancing impedance by said second amplifying means to produce a second direct-current signal,
- and means for applying the difference between said first direct-current signal and said second direct-current signal to said balanced arrangement of nonlinear impedance elements to change the alternating-current impedance of said artificial balancing impedance until said first direct-current signal and said second direct-current signal are nearly equal.

3. A combination according to claim 2 additionally including semiconductor means for disconnecting said difference-applying means from said balanced arrangement when no signals are originating in said adjoining link.

4. A combination according to claim 3 in which the means for disconnecting the difference-applying means from the balanced arrangement of nonlinear impedance elements when no signals are originating in the adjoining link includes a bilateral electronic switch including first and second semiconductor switching devices having unilateral conduction paths connected in parallel combination with opposite polarities in the difference signal path from said difference-applying means to said balanced arrangement.

5. A combination according to claim 3 additionally including means for holding the impedance of the balanced arrangement substantially constant within a normal operating range when the difference-applying means are disconnected from said balanced arrangement.

6. A combination according to claim 5 in which the means for holding the impedance of the balanced arrangement of nonlinear impedance elements substantially constant with in a normal operating range includes a diode arrangement with
- a first diode oriented to conduct a current to reduce said impedance of said balanced arrangement when said impedance of said balanced arrangement exceeds a normal operating range,
- and a second diode oriented to conduct a current to increase said impedance of said balanced arrangement when said impedance of said balanced arrangement falls below a normal operating range.

7. A junction for interconnecting a bilateral signal path with a first unilateral signal path for carrying alternating-current signals toward said junction and with a second unilateral signal path for carrying alternating-current signals away from said junction, comprising
- means for applying alternating-current signals from said first path to said bilateral path,
- an artificial balancing impedance variable by a direct-current signal,
- means for applying alternating-current signals from said first path to said artificial balancing impedance,
- means for interconnecting said second path with said bilateral path and said artificial balancing impedance to receive no alternating-current signals from said first path when said artificial balancing impedance balances said bilateral path, and
- means for applying differences between alternating-current signals across said bilateral path and alternating-current signals across said artificial balancing impedance to said artificial balancing impedance as said direct-current signal to vary said artificial balancing impedance to balance said bilateral path when alternating-current signals are being carried by said first path, including means for delaying the application of said differences to said artificial balancing impedance for a time period after initiation of said signals in said first path and means for disconnecting said difference-applying means from said artificial balancing impedance within substantially less time than said time period after alternating-current signals cease to be carried by said first path.

8. A junction according to claim 7 wherein the disconnecting means includes a rectifier responding to signals in said first path, a series circuit including resistance, capacitance, and a nonreciprocally conducting device connected across the output of said rectifier, said device being characterized by less resistance to current produced by an increasing output voltage of said rectifier than to current produced by a decreasing output voltage of said rectifier, and a voltage-sensitive switching circuit with an input connected across the series combination of said capacitance and said nonreciprocally conducting device and with an output connected to said difference-applying means.

9. A system for joining a two-wire line and a four-wire line in a telephone system, comprising an electrically-biased nonlinear impedance arrangement including a source of direct current, a plurality of varistor elements connected to said source of direct current to carry a common direct current and connected to said four-wire line to carry alternating currents through a first portion of said plurality of elements in additive polarity with said common direct current and through a second portion of said plurality of elements in subtractive polarity with said common direct current, and a transistor with collector-emitter current path shunting said varistor elements and with a base-emitter circuit having a high input impedance, a first rectifier for rectifying signals appearing across said two-wire line, a second rectifier for rectifying signals appearing across said impedance arrangement, said second rectifier being connected to said first rectifier at a common potential point to give an output of polarity opposite to the polarity of the output of said first rectifier with respect to said common potential point, a direct-current amplifier connected to said first and second rectifiers to detect differences between the outputs of said first and second rectifiers, a capacitor connected across said base-emitter circuit of said shunting transistor, and switching means for connecting the output of said direct-current amplifier to said capacitor.

10. A system according to claim 9 in which the first and second rectifiers include balanced rectifying means for preventing signal drift within said first and second rectifiers, and means for providing a direct current through said balanced rectifying means, which direct current is common to both said first and second rectifiers.

11. Apparatus for forming a junction between a two-wire line and a four-wire line in a telephone system, comprising a line amplifier for applying signals from said four-wire line to said two-wire line, a plurality of cascaded line-balancing amplifiers for amplifying signals from said four-wire line, a plurality of nonlinear impedance elements connected between two successive amplifiers of said plurality of cascaded line-balancing amplifiers in an arrangement which is balanced for alternating-current signals applied to said plurality of elements, means for detecting a difference between the output of said line amplifier and the output of the last one of said plurality of cascaded line-balancing amplifiers, and means for applying said detected difference to said plurality of nonlinear impedance elements to change the impedance of said impedance elements to reduce said difference.

12. Apparatus in accordance with claim 11 additionally including a second plurality of nonlinear impedance elements interconnected with said plurality of line-balancing amplifiers in an arrangement which is balanced for alternating-current signals applied to said second plurality and electrically isolated from the aforesaid plurality of nonlinear impedance elements, an electrically reactive element interconnected with said second plurality of nonlinear impedance elements, means for detecting a second difference between the output of the line amplifier and the output of the last of the plurality of cascaded line balancing amplifiers, and means for applying said second detected difference to said second plurality of nonlinear impedance elements to change the impedance of said second plurality of nonlinear impedance elements to reduce said second difference.

13. Apparatus in accordance with claim 12 additionally including a third plurality of nonlinear impedance elements interconnected with said plurality of line-balancing amplifiers in an arrangement which is balanced for alternating-current signals applied to said third plurality and electrically isolated from the first and second pluralities of nonlinear impedance elements, a second electrically reactive element of opposite reactive type from the aforesaid electrically reactive element interconnected with said third plurality of nonlinear impedance elements, and means for blocking the second detected difference when in a selected signal range from said second plurality of nonlinear impedance elements and applying said second detected difference when in said selected range to said third plurality of nonlinear impedance elements to change the impedance of said third plurality of nonlinear impedance elements to reduce said second difference.

14. Apparatus in accordance with claim 13 wherein the second difference detecting means includes means for selecting components of the outputs of the line amplifier and the last line-balancing amplifier in a first frequency range, said second difference detecting means being adapted to detect the second difference from the selected components in said first frequency range, means for selecting components of the outputs of said line amplifier and said last line-balancing amplifier in a second frequency range different from said first frequency range, means for detecting a third difference between said output of said line amplifier and said output of said last line balancing amplifier from the selected components in said second frequency range, and additionally including a fourth plurality of nonlinear impedance elements interconnected with the plurality of line-balancing amplifiers in an arrangement which is balanced for alternating-current signals applied to said fourth plurality and electrically isolated from the first, second and third pluralities of nonlinear impedance elements, a third electrically reactive element interconnected with said fourth plurality of nonlinear impedance elements, a fifth plurality of nonlinear impedance elements interconnected with said plurality of line-balancing amplifiers in an arrangement which is balanced for alternating-current signals applied to said fifth plurality and electrically isolated from said first, second, third and fourth pluralities of nonlinear impedance elements, a fourth electrically reactive element of opposite reactive type from the third electrically reactive element interconnected with said fifth plurality of nonlinear impedance elements, means for applying said third difference to said fourth plurality of nonlinear impedance elements to change the impedance of said fourth plurality of nonlinear impedance elements to reduce said third difference, and means for blocking said third detected difference when in a selected signal range from said fourth plurality of nonlinear impedance elements and applying said third detected difference when in said selected signal range to said fifth plurality of nonlinear impedance elements to change the impedance of said fifth plurality of nonlinear impedance elements to reduce said third difference.

References Cited by the Examiner

UNITED STATES PATENTS

| | | | |
|---|---|---|---|
| 2,302,374 | 11/42 | Mitchell | 179—170 |
| 3,034,074 | 5/62 | Perkins | 307—88.5 |

ROBERT H. ROSE, *Primary Examiner.*